United States Patent
Hrastar et al.

(10) Patent No.: US 11,537,966 B2
(45) Date of Patent: Dec. 27, 2022

(54) SYSTEMS AND METHODS FOR USE OF A GLOBAL REGISTRY WITH AUTOMATED DEMAND PROFILING VIA MACHINE LEARNING TO OPTIMIZE INVENTORY MANAGEMENT

(71) Applicant: Demand Driven Technologies, Inc., Atlanta, GA (US)

(72) Inventors: Scott E. Hrastar, Duluth, GA (US); Hugh Dylan Broome, Malabar, FL (US)

(73) Assignee: Demand Driven Technologies, Inc., Atlanta, GA (US)

( * ) Notice: Subject to any disclaimer, the term of this patent is extended or adjusted under 35 U.S.C. 154(b) by 0 days.

(21) Appl. No.: 17/353,261

(22) Filed: Jun. 21, 2021

(65) Prior Publication Data
US 2021/0398049 A1    Dec. 23, 2021

Related U.S. Application Data

(60) Provisional application No. 63/041,359, filed on Jun. 19, 2020.

(51) Int. Cl.
*G06Q 10/06* (2012.01)
*G06N 20/00* (2019.01)
(Continued)

(52) U.S. Cl.
CPC ......... *G06Q 10/06315* (2013.01); *G06N 5/04* (2013.01); *G06N 20/00* (2019.01);
(Continued)

(58) Field of Classification Search
CPC .......... G06N 20/00; G06N 5/04; G06N 5/003; G06N 7/005; G06Q 10/0637;
(Continued)

(56) References Cited

U.S. PATENT DOCUMENTS

| 6,976,001 B1 * | 12/2005 | Levanoni | G06Q 10/06 |
| | | | 705/7.31 |
| 8,788,315 B2 * | 7/2014 | McMains | G06Q 10/04 |
| | | | 705/7.31 |

(Continued)

FOREIGN PATENT DOCUMENTS

EP        2133822 A1    12/2009

OTHER PUBLICATIONS

Leskovec, Jure et al., Mining of Massive Datasets—Chapter 7 Clustering Cambridge University Press, 2014 (Year: 2014).*

(Continued)

*Primary Examiner* — Scott L Jarrett
(74) *Attorney, Agent, or Firm* — Morris, Manning & Martin, LLP; Daniel E. Sineway, Esq.; Adam J. Thompson, Esq.

(57) ABSTRACT

In various embodiments, the disclosed system may be utilized in managing supply and demand chains to optimize creation and management of inventory buffer levels via machine learning. In several embodiments, optimizing inventory buffer levels may lead to minimizing costs while maximizing the availability and timeliness of product deliveries. In multiple embodiments, the disclosed system may utilize supply chain data and performance monitoring with automated machine learning and derivation of demand signatures and profiles to provide optimized creation and management of inventory buffer levels.

17 Claims, 6 Drawing Sheets

(51) Int. Cl.
*G06Q 10/04* (2012.01)
*G06Q 10/08* (2012.01)
*G06Q 30/02* (2012.01)
*G06N 5/04* (2006.01)

(52) U.S. Cl.
CPC ........... *G06Q 10/04* (2013.01); *G06Q 10/087* (2013.01); *G06Q 30/0204* (2013.01)

(58) Field of Classification Search
CPC ........... G06Q 30/0204; G06Q 30/0201; G06Q 10/087; G06Q 10/067; G06Q 10/063; G06Q 30/0202
See application file for complete search history.

(56) References Cited

U.S. PATENT DOCUMENTS

| | | | | |
|---|---|---|---|---|
| 10,489,802 | B1* | 11/2019 | Zhdanov | G06Q 30/0202 |
| 2002/0169657 | A1* | 11/2002 | Singh | G06Q 10/06 |
| | | | | 705/7.31 |
| 2004/0230473 | A1* | 11/2004 | Dogan | G06Q 10/06 |
| | | | | 705/7.25 |
| 2005/0004831 | A1* | 1/2005 | Najmi | G06Q 10/087 |
| | | | | 705/7.22 |
| 2007/0124009 | A1* | 5/2007 | Bradley | G06Q 10/087 |
| | | | | 700/99 |
| 2010/0125489 | A1* | 5/2010 | Surendra | G06Q 10/06 |
| | | | | 705/22 |
| 2010/0228604 | A1* | 9/2010 | Desai | G06Q 30/0202 |
| | | | | 705/7.31 |
| 2015/0161545 | A1* | 6/2015 | Willemain | G06Q 10/087 |
| | | | | 705/7.25 |
| 2015/0302433 | A1* | 10/2015 | Li | G06Q 30/0202 |
| | | | | 705/31 |
| 2017/0228661 | A1* | 8/2017 | Chien | G06Q 10/063 |
| 2019/0147465 | A1* | 5/2019 | Okamoto | G06Q 50/06 |
| | | | | 705/7.31 |
| 2019/0228372 | A1* | 7/2019 | Saylor | G06F 30/20 |
| 2020/0294067 | A1* | 9/2020 | Ghosh | G06Q 30/0201 |
| 2021/0035250 | A1* | 2/2021 | Ganesan | G06Q 10/067 |
| 2021/0248481 | A1* | 8/2021 | Watanabe | G06Q 30/0202 |

OTHER PUBLICATIONS

Posadas, Sergio et al., Forecasting Parts Demand Using Service Data and Machine Learning LMI, vol. 1, Jan. 2020 (Year: 2020).*
Stefanovic, Nenad, Predictive analytical model for spare parts inventory replenishment ICIST 2014, vol. 1, 2014 (Year: 2014).*
Weller, Todd W. et al., k-Means Clustering, 2016 (Year: 2016).*
International Search Report and Written Opinion issued in International Application No. PCT/US2021/038247, dated Oct. 14, 2021.

* cited by examiner

SYSTEMS AND METHODS FOR USE OF A GLOBAL REGISTRY WITH AUTOMATED DEMAND PROFILING VIA MACHINE LEARNING TO OPTIMIZE INVENTORY MANAGEMENT

CROSS-REFERENCE TO RELATED APPLICATION

This application claims benefit of and priority to U.S. Provisional Patent Application No. 63/041,359, filed on Jun. 19, 2020, entitled "SYSTEMS AND METHODS FOR USE OF A GLOBAL REGISTRY WITH AUTOMATED DEMAND PROFILING VIA MACHINE LEARNING TO OPTIMIZE INVENTORY MANAGEMENT," which is incorporated herein by reference in its entirety.

BACKGROUND

Manufacturers, suppliers, and distributors maintain a part inventory in order to meet demand and fulfill orders on time. Parts are taken from the inventory as needed (the "demand" for a part), and parts are ordered as the supply of parts in the inventory lessens (known as "replenishment orders"). One goal for the manufacturers, suppliers, and distributors is to maintain the inventory at an optimal level that minimizes inventory costs (e.g., having a small number of items in the inventory reduces inventory costs) while maximizing on-time delivery schedules (e.g., fulfilling orders on time). Generally, for parts that have varying lead times (e.g., the time between ordering a part and receiving the part in the inventory), having a small number of parts in the inventory will result in the user not fulfilling orders on time. Thus, determining and maintaining an optimal inventory level for all parts utilized by the user is highly important. However, for manufacturers that utilize thousands of different parts, determining the optimal inventory levels and replenishment parameters for each individual part is inefficient. Further, as demand for individual parts changes over time, the optimal inventory levels and replenishment parameters for the parts need to be continuously updated.

Therefore, there is a long-felt but unresolved need for a system or process that utilizes machine learning to optimize the inventory parameters for individual parts to maintain optimized inventory levels and parameters.

BRIEF SUMMARY OF THE DISCLOSURE

Briefly described, and according to one embodiment, aspects of the present disclosure generally relate to systems and methods for supply chain management, and, more specifically, optimizing inventory management using machine learning.

In various embodiments, the disclosed system may be utilized in managing supply and demand chains to optimize creation and management of inventory levels via machine learning. In several embodiments, optimizing inventory levels may lead to minimizing costs while maximizing the availability and timeliness of products and product deliveries.

In multiple embodiments, the disclosed system may utilize supply chain data and performance monitoring with automated machine learning and derivation of demand signatures and profiles to provide optimized creation and management of inventory buffer levels. In one or more embodiments, the supply chain data may include historical data, current data, and/or projected data. In at least one embodiment, the disclosed system may collect supply chain data via a data collector that connects to customer data sources and accumulates data.

In various embodiments, a user may define one or more policies regarding rules for individual parts to be ordered and/or grouped. In many embodiments, individual parts may be items to be stocked via an inventory process. In several embodiments, the disclosed system may select a profiling mechanism for demand data profiling for individual parts. In some embodiments, the individual part demand profile may be associated with a set of demand signals over a set period of time. In one embodiment, a set of demand signals for an individual part is the demand data for the individual part.

In multiple embodiments, the disclosed system may calculate demand profiles for individual parts, select a number of groups in which to group the individual parts, select group centers (e.g., demand profiles of selected individual parts) and compare the individual part demand profiles against the group center profiles to determine a similarity metric for each individual part demand profile and each group center profile via a machine learning engine. In many embodiments, the disclosed system may determine the number of groups automatically based on an optimization function or a user may manually select a desired number of part groups.

In various embodiments, the disclosed system may calculate a representative demand profile for each group. In some embodiments, the representative demand profile for each group may be an exemplar demand signal that best approximates the group. In at least one embodiment, the disclosed system may calculate the representative demand profile as the average demand from the individual parts in the group. In one or more embodiments, the disclosed system may determine an objective function to optimize buffering levels per individual parts or groups, based on the representative demand profile or each group. In one embodiment, the disclosed system may utilize the objective function to determine the optimized parameters for buffer inventory for an individual part or group. In a further embodiment, the newly determined optimized parameters may define a change in the supply chain data or customer demand data, which may signal to the disclosed system to restart the process based on the new input data. In a further embodiment, the calculated representative demand profile data for each group and the associated optimized parameters for buffer inventory may be stored in a global part profile registry.

In multiple embodiments, the disclosed system may determine an individual part demand profile from supply chain data, and compare the individual part demand profile to global exemplar profiles stored in the global part profile registry. In many embodiments, comparing the individual part demand profile to global exemplar profiles may allow the disclosed system to determine optimized parameters for individual parts without requiring optimization function calculations for all parts. In some embodiments, once the disclosed system has compared the individual part demand profile with the global exemplar profiles, the disclosed system identifies the global exemplar profile that is most similar to the individual part signature, identifies the optimized inventory parameters associated with the most similar global exemplar profile, and updates the optimized inventory parameters for the individual part with the optimized inventory parameters from the most similar global exemplar profile. In a further embodiment, the disclosed system may calculate a difference between the most similar global exemplar profile and the individual part signature, and if the difference is within certain bounds set by a policy, the disclosed system may replace the individual part profile data, including optimized inventory parameters, with the most similar global exemplar profile data. In yet a further embodiment, if the difference is not within the bounds as described by the policy, the disclosed system may continue with the optimization calculation process to determine optimal inventory parameters that optimize the buffer level.

In various embodiments, the disclosed system may determine that an individual part or group should be adjusted based on changes in the inputs to the disclosed system. In many embodiments, the disclosed system may automatically begin the process of optimizing buffer inventory levels if the disclosed system determines that an input has changed. In several embodiments, an input may be created by the user, such as a policy, so the disclosed system may determine new optimized buffer inventory levels based on new policies or other user-defined changes to the disclosed system.

According to a first aspect, a method for inventory management optimization, including: receiving supply chain data corresponding to a plurality of parts; determining a demand profile for each of the plurality of parts based on the supply chain data; defining a number of similarity groups for grouping the plurality of parts according to their respective demand profiles; selecting a similarity group center for each of the number of similarity groups, wherein the similarity group center includes a demand profile for a representative part; comparing, via a similarity function, the demand profiles for each of the plurality of parts to the demand profiles of the similarity group centers to determine similarity metrics between the demand profiles for each of the plurality of parts and the demand profiles of the similarity group centers; assigning each of the plurality of parts into a respective similarity group based on the similarity metrics between the demand profiles for each of the plurality of parts and the demand profiles of the similarity group centers; calculating a representative demand profile for each respective similarity group; determining an optimization function for each respective similarity group based on its calculated representative demand profile; determining optimized inventory parameters for each respective similarity group based on the optimization function; and associating the optimized inventory parameters for each respective similarity group and the calculated representative demand profile for each respective similarity group with each of the plurality of parts assigned to its respective similarity group.

According to a second aspect, the method of the first aspect or any other aspect, further including: determining if the calculated representative demand profile for each similarity group is within a predetermined group threshold prior to determining the optimization function; upon determination that the calculated representative demand profile for each similarity group is not within the predetermined group threshold, replacing the demand profiles for each of the plurality group centers with the calculated representative demand profiles; comparing, via the similarity function, the demand profiles for each of the plurality of parts to the demand profiles of the new similarity group centers to determine new similarity metrics between the demand profiles for each of the plurality of parts and the demand profiles of the new similarity group centers; and assigning each of the plurality of parts into a new respective similarity group based on the new similarity metrics between the demand profiles for each of the plurality of parts and the demand profiles of the new respective similarity group centers.

According to a third aspect, the method of the first aspect or any other aspect, further including: receiving new supply chain data for the plurality of parts; determining a new demand profile for each of the plurality of parts based on the new supply chain data; comparing, via the similarity function, the new demand profiles for each of the plurality of parts to the calculated representative demand profile associated with the plurality of parts to determine new similarity metrics between the new demand profiles for each of the plurality of parts and the calculated representative demand profiles associated with each of the plurality of parts; and upon determining that the new similarity metrics are within a predetermined similarity threshold, taking a pre-determined action with respect to the plurality of parts.

According to a fourth aspect, the method of the first aspect or any other aspect, wherein the optimized inventory parameters include at least one of the following: replenishment order trigger, optimal inventory amounts, optimal order lead times for an individual part.

According to a fifth aspect, the method of the first aspect or any other aspect, wherein the pre-determined action includes one or more of the following: comparing a current inventory level for one or more parts to the optimized inventory parameters and automatically placing a replenishment order for one or more parts if the current inventory level is at or exceeds a replenishment order trigger, monitoring for new supply chain data, recalculating the optimized inventory parameters for a respective part, storing the calculated representative demand profile and associated optimized inventory parameters in one or more profile registries.

According to a sixth aspect, the method of claim 1, further including: displaying, on a display, one or more of the following: one or more individual part demand profiles, one or more new individual part demand profiles, one or more calculated representative demand profiles for a respective similarity group, one or more similarity metrics, optimized inventory parameters for one or more similarity groups, supply chain data, new supply chain data.

According to a seventh aspect, the method of the first aspect or any other aspect, wherein the similarity function includes a distance function.

According to an eighth aspect, the method of the seventh aspect or any other aspect, wherein the distance function includes a Euclidean function.

According to a ninth aspect, a method for optimizing inventory management, including: receiving supply chain data for a part; determining a demand profile for the part based on the supply chain data; comparing the demand profile for the part to group demand profiles stored in one or more profile registries, wherein the group demand profiles stored in the one or more profile registries are associated with optimized inventory parameters; determining, via a similarity function, that the demand profile for the part is similar to a particular demand profile stored in the one or more profile registries; associating particular optimized inventory parameters corresponding to the particular demand profile with the part; and taking a predetermined action with respect to the part.

According to a tenth aspect, the method of the ninth aspect or any other aspect, wherein the group demand profiles stored in the one or more profile registries are calculated representative demand profiles for similarity groups; and wherein the calculated representative demand profile for the particular demand profile is updated to include the demand profile for the part.

According to an eleventh aspect, the method of the ninth aspect or any other aspect, wherein the pre-determined action includes one or more of the following: comparing a current inventory level for one or more parts to the optimized inventory parameters and automatically placing a replenishment order for one or more parts if the current inventory level is at or exceeds a replenishment order trigger, monitoring for new supply chain data, recalculating the optimized inventory parameters for a respective part, storing the calculated representative demand profile and associated optimized inventory parameters in one or more profile registries.

According to a twelfth aspect, the method of the first aspect or any other aspect, wherein calculating the representative demand profile for each respective similarity group includes calculating an average demand profile for each respective similarity group based on the demand profiles of the plurality of parts in each respective similarity group.

According to a thirteenth aspect, an inventory management optimization system, including: a memory storing supply chain data; and at least one processor operatively connected to the memory, the at least one processor configured for: receiving supply chain data corresponding to a plurality of parts; determining a demand profile for each of the plurality of parts based on the supply chain data; defining a number of similarity groups for grouping the plurality of parts according to their respective demand profiles; selecting a similarity group center for each of the number of similarity groups, wherein the similarity group center includes a demand profile for a representative part; comparing, via a similarity function, the demand profiles for each of the plurality of parts to the demand profiles of the similarity group centers to determine similarity metrics between the demand profiles for each of the plurality of parts and the demand profiles of the similarity group centers; assigning each of the plurality of parts into a respective similarity group based on the similarity metrics between the demand profiles for each of the plurality of parts and the demand profiles of the similarity group centers; calculating a representative demand profile for each respective similarity group; determining an optimization function for each respective similarity group based on its calculated representative demand profile; determining optimized inventory parameters for each respective similarity group based on the optimization function; and associating the optimized inventory parameters for each respective similarity group and the calculated representative demand profile for each respective similarity group with each of the plurality of parts assigned to its respective similarity group.

According to a fourteenth aspect, the system of the thirteenth aspect or any other aspect, wherein the at least one processor is further configured for: determining if the calculated representative demand profile for each similarity group is within a predetermined group threshold prior to determining the optimization function; upon determination that the calculated representative demand profile for each similarity group is not within the predetermined group threshold, replacing the demand profiles for each of the plurality group centers with the calculated representative demand profiles; comparing, via the similarity function, the demand profiles for each of the plurality of parts to the demand profiles of the new similarity group centers to determine new similarity metrics between the demand profiles for each of the plurality of parts and the demand profiles of the new similarity group centers; and assigning each of the plurality of parts into a new respective similarity group based on the new similarity metrics between the demand profiles for each of the plurality of parts and the demand profiles of the new respective similarity group centers.

According to a fifteenth aspect, the system of the thirteenth aspect or any other aspect, wherein the at least one processor is further configured for: receiving new supply chain data for the plurality of parts; determining a new demand profile for each of the plurality of parts based on the new supply chain data; comparing, via the similarity function, the new demand profiles for each of the plurality of parts to the calculated representative demand profile associated with the plurality of parts to determine new similarity metrics between the new demand profiles for each of the plurality of parts and the calculated representative demand profiles associated with each of the plurality of parts; and upon determining that the new similarity metrics are within a predetermined similarity threshold, taking a pre-determined action with respect to the plurality of parts.

According to a sixteenth aspect, the system of the thirteenth aspect or any other aspect, wherein the optimized inventory parameters include at least one of the following: replenishment order trigger, optimal inventory amounts, optimal order lead times for an individual part.

According to a seventeenth aspect, the system of the thirteenth aspect or any other aspect, wherein the pre-determined action includes one or more of the following: comparing a current inventory level for one or more parts to the optimized inventory parameters and automatically placing a replenishment order for one or more parts if the current inventory level is at or exceeds a replenishment order trigger, monitoring for new supply chain data, recalculating the optimized inventory parameters for a respective part, storing the calculated representative demand profile and associated optimized inventory parameters in one or more profile registries.

According to an eighteenth aspect, the system of the thirteenth aspect or any other aspect, further including: a display for displaying one or more of the following: one or more individual part demand profiles, one or more new individual part demand profiles, one or more calculated representative demand profiles for a respective similarity group, one or more similarity metrics, optimized inventory parameters for one or more similarity groups, supply chain data, new supply chain data.

According to a nineteenth aspect, the system of the thirteenth aspect or any other aspect, wherein the similarity function includes a distance function.

According to a twentieth aspect, the system of the nineteenth aspect or any other aspect, wherein the distance function includes a Euclidean function.

These and other aspects, features, and benefits of the claimed system and processes will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DISCUSSION

Figure 1:
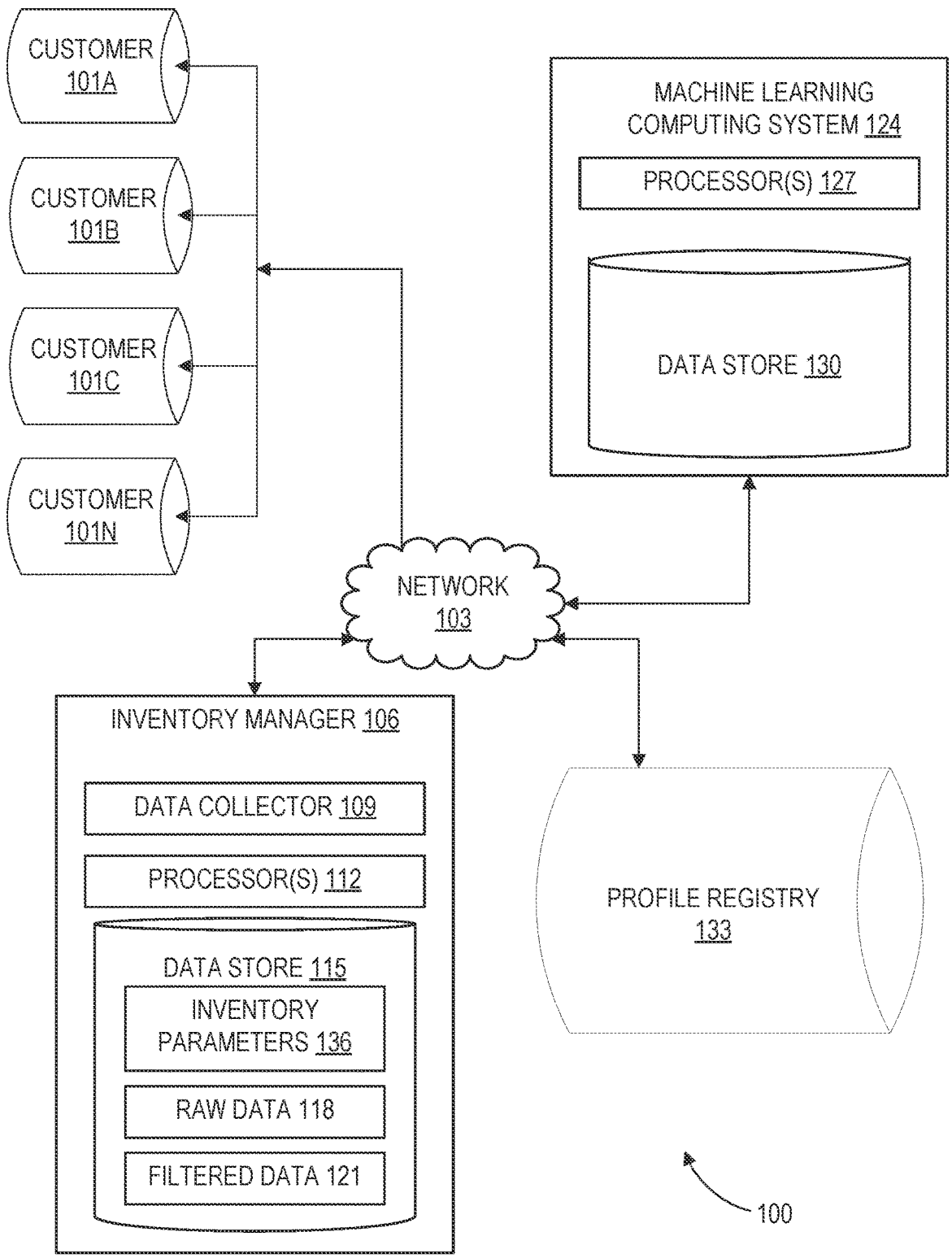
FIG. 1 illustrates an exemplary system architecture of an exemplary inventory optimization system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to supply chain management, and, in particular, the optimization of inventory levels for individual parts in an inventory management system.

Manufactures and distributors face a difficult task in keeping the optimal amount of parts stocked in inventory for either a manufacturing process (e.g., using parts in inventory to manufacture goods) or stocking goods in stores to sell. For example, a manufacturer could consistently order enough parts so that the manufacturer never runs out of parts for the manufacturing process, but this would result in extreme inventory costs (e.g., having enough parts in inventory to never miss an outgoing order is cost prohibitive). Thus, the manufacturers and distributors aim to keep the optimal amount of parts in inventory while keeping inventory costs minimized. As used in the present disclosure, a "part" may be both a type of part or raw material used in a manufacturing process and a type of item that may be stocked on a store shelf or at a place of business. For example, in one embodiment, a manufacturer may keep a type X screw in stock for use in a manufacturing process to make a type A item, which is sold to a distributor that puts the type A item on a shelf to sell. Both the type X screw and the type A item are "parts" as described in the present disclosure.

In various embodiments, the disclosed inventory management system may optimize the supply chain delivery, ordering, and replenishment processes by profiling parts according to the demand profiles, lead times, maximum or minimum ordering requirements, and other supply chain information for each part to enable more efficient ordering, stocking, and management of each part in the inventory, in order to maintain an optimized inventory.

In various embodiments, the disclosed system may be utilized in managing supply and demand chains to optimize creation and management of inventory levels via machine learning. In several embodiments, optimizing inventory levels may lead to minimizing costs while maximizing the availability and timeliness of products and product deliveries.

In multiple embodiments, the disclosed system may utilize supply chain data and performance monitoring with automated machine learning and derivation of demand signatures and profiles to provide optimized creation and management of inventory levels. In one or more embodiments, the supply chain data may include historical data, current data, and/or projected data. In at least one embodiment, the disclosed system may collect supply chain data via a data collector that connects to customer data sources and accumulates data.

In various embodiments, a user may define one or more policies regarding rules for individual parts to be ordered and/or grouped. In many embodiments, individual parts may be items to be stocked via an inventory process. In several embodiments, the disclosed system may select a profiling mechanism for demand data profiling for individual parts. In some embodiments, the individual part demand profile may be associated with a set of demand signals over a set period of time.

In multiple embodiments, the disclosed system may calculate demand profiles for individual parts, select a number of groups in which to group the individual parts, select similarity group centers (e.g., demand profiles of selected individual parts) and compare the individual part demand profiles against the group center profiles to determine a similarity metric for each individual part demand profile and each group center profile via a machine learning engine. In one or more embodiments, the similarity group center for a group is an exemplar or representative demand profile for the group. In many embodiments, the disclosed system may determine the number of groups automatically based on an optimization function or a user may manually select a desired number of part groups.

In various embodiments, the disclosed system may determine a representative demand profile for each group. In some embodiments, the representative demand profile for each group may be an exemplar demand profile that best approximates the group. In many embodiments, the disclosed system may calculated the representative demand profile for each group as the average demand from the individual parts in the group, or may be randomly selected from a range of demand profiles for the individual parts. In one or more embodiments, the disclosed system may determine an objective function to optimize buffering levels per individual parts or groups, based on the representative demand profile or each group. In one embodiment, the disclosed system may utilize the objective function to determine the optimized parameters for buffer inventory for an individual part or group. In a further embodiment, the newly determined optimized parameters may define a change in the supply chain data or customer demand data, which may signal to the disclosed system to restart the process based on the new input data. In a further embodiment, the calculated representative demand profile data for each group and the associated optimized parameters for buffer inventory may be stored in a global part profile registry.

In multiple embodiments, the disclosed system may determine an individual part demand profile from supply chain data, and compare the individual part demand profile to global exemplar profiles stored in the global part profile registry. In many embodiments, comparing the individual part demand profile to global exemplar profiles may allow the disclosed system to determine optimized parameters for individual parts without requiring optimization function calculations for all parts. In some embodiments, once the disclosed system has compared the individual part demand profile with the global exemplar profiles, the disclosed system identifies the global exemplar profile that is most similar to the individual part signature, identifies the optimized inventory parameters associated with the most similar global exemplar profile, and updates the optimized inventory parameters for the individual part with the optimized inventory parameters from the most similar global exemplar profile. In a further embodiment, the disclosed system may calculate a difference between the most similar global exemplar profile and the individual part signature, and if the difference is within certain bounds set by a policy, the disclosed system may replace the individual part profile data, including optimized inventory parameters, with the most similar global exemplar profile data. In yet a further embodiment, if the difference is not within the bounds as described by the policy, the disclosed system may continue with the optimization calculation process to determine optimal inventory parameters that optimize the buffer level.

In various embodiments, the disclosed system may determine that an individual part or group should be adjusted based on changes in the inputs to the disclosed system. In many embodiments, the disclosed system may automatically begin the process of optimizing buffer inventory levels if the disclosed system determines that an input has changed. In several embodiments, an input may be created by the user, such as a policy, so the disclosed system may determine new optimized buffer inventory levels based on new policies or other user-defined changes to the disclosed system.

Exemplary Embodiments

FIG. 1 shows an exemplary system architecture 100 of an exemplary inventory optimization system, according to one embodiment of the present disclosure. In many embodiments, the system architecture includes one or more customer databases 101 (shown as Customer 101A, Customer 101B, Customer 101C, and Customer 101N in FIG. 1), a machine learning computing system 124, one or more profile registries 133, and an inventory manager 106, which are in data communication with each other via a network 103. In some embodiments, the network 103 includes, for example, the Internet, intranets, extranets, wide area networks (WANs), local area networks (LANs), wired networks, wireless networks, or other suitable networks, etc., or any combination of two or more such networks. In one embodiment, for example, such networks can include satellite networks, cable networks, Ethernet networks, Bluetooth networks, Wi-Fi networks, LoRaWAN network, NFC networks, and other types of networks.

In various embodiments, the customer databases 101 may include customer supply chain data. In one or more embodiments, the supply chain data may include historical, current daily, and/or projected part inventory information for each type of part in the customer database 101, among other data types. In several embodiments, each specific type of part in the customer databases 101 has part inventory information, which is dependent on how often the specific type of part is utilized (e.g., "demanded") by the manufacturing process or sold by the distributor. In at least one embodiment, the part inventory information for a certain type of part may include, but is not limited to, a number of parts consumed on a certain day (e.g., the amount of parts taken out of inventory to be used in the manufacturing process or sold), a number of parts replenished on a certain day (e.g., the amount of parts going into the inventory from part replenishment orders), a number of parts in open replenishment orders (e.g., an amount of parts that have been ordered but not received in inventory), adjustments to inventory count for a certain day (e.g., the change in amount of parts in inventory), and/or end of day inventory (e.g., the amount of parts in inventory at the end of the day). In some embodiments, the customer databases 101 may be one or more Enterprise Resource Planning (ERP) and/or Materials Requirements Planning (MRP) system(s) of record within a customer environment.

In one or more embodiments, the inventory manager 106 may include a data collector 109, one or more processors 112 and the data store 115 that stores optimized inventory parameters 136. In at least one embodiment, the optimized inventory parameters 136 may be pushed or pulled from the inventory manager 106 to the customer supply chain system. In another embodiment, the inventory manager 106 may be the customer supply chain system.

In some embodiments, the data collector 109 may collect supply chain data from the customer databases 101 and store the supply chain data in the data store 115 as raw data 118. In at least one embodiment, the data collector 109 may connect to a customer database 101 and push/pull the supply chain data to a customer data store 115. In one embodiment, the data collector 109 is a software application or application programming interface (API) that may filter through the supply chain data to output the supply chain data utilized by the disclosed system. In many embodiments, the data collector 109 may access the supply chain data via connectors to the Enterprise Resource Planning (ERP) and/or Materials Requirements Planning (MRP) system(s) of record within the customer environment. In one or more embodiments, the disclosed system or data collector 109 may pre-process the collected supply chain data by filtering out duplicate, missing, and/or invalid data and store the filtered data 121 in the data store 115. In one embodiment, the disclosed system or data collector 109 may also format the filtered data 121.

In many embodiments, the machine learning computing system 124 may include one or more processors 127, and one or more data stores 130. In at least one embodiment, the machine learning computing system 124 may utilize the filtered data 121 in the machine learning process to determine optimized inventory parameters.

In several embodiments, the machine learning computing system 124, via one or more processors 127, may first determine a demand profile for each individual part and form one or more groups of individual parts based on the similarities between the demand profiles. In certain embodiments, a demand profile for a particular individual part utilizes the part inventory information for the particular individual part to determine the amount of the particular individual parts on a certain time scale (e.g., "demand"). In at least one embodiment, a demand profile for individual parts may be a demand signal time series for an individual part, or may be an extraction of exemplar features from the original demand signal time series. In one or more embodiments, the demand signal time series may include graphing the demand data for a certain part over a period of time. In some embodiments, the disclosed system may create individual part demand profiles from a comparison of the individual part demand data over a period of time. For example, in one embodiment, over a period of five days, a part X may have been purchased from an end retailer or supplier, or used by a manufacturer in the manufacturing process 4, 7, 6, 3, and 5 times, respectively, and the demand profile for part X may show a line graph of the parts purchased or used each day. In one or more embodiments, the demand signal time series may be the demand for a part over a year, month, week, day (e.g., 8 parts at 10:00 AM, 6 parts at 1:00 PM, 12 parts at 3:00 PM, etc.), or any other time period (e.g., 45 days).

Figure 2A:
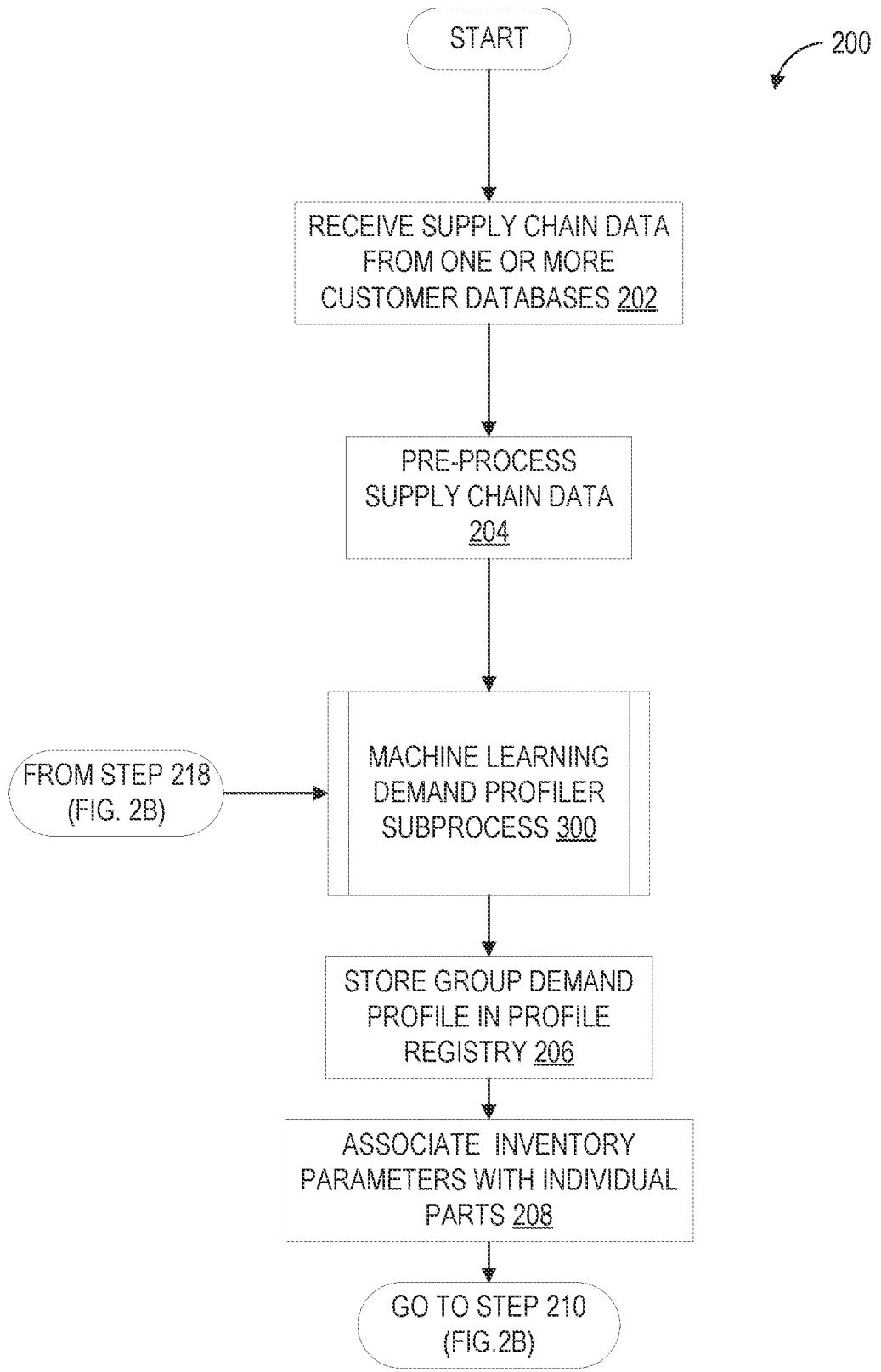
FIG. 2A illustrates a flow chart of an exemplary inventory optimization machine learning process, according to one embodiment of the present disclosure.
Figure 2B:
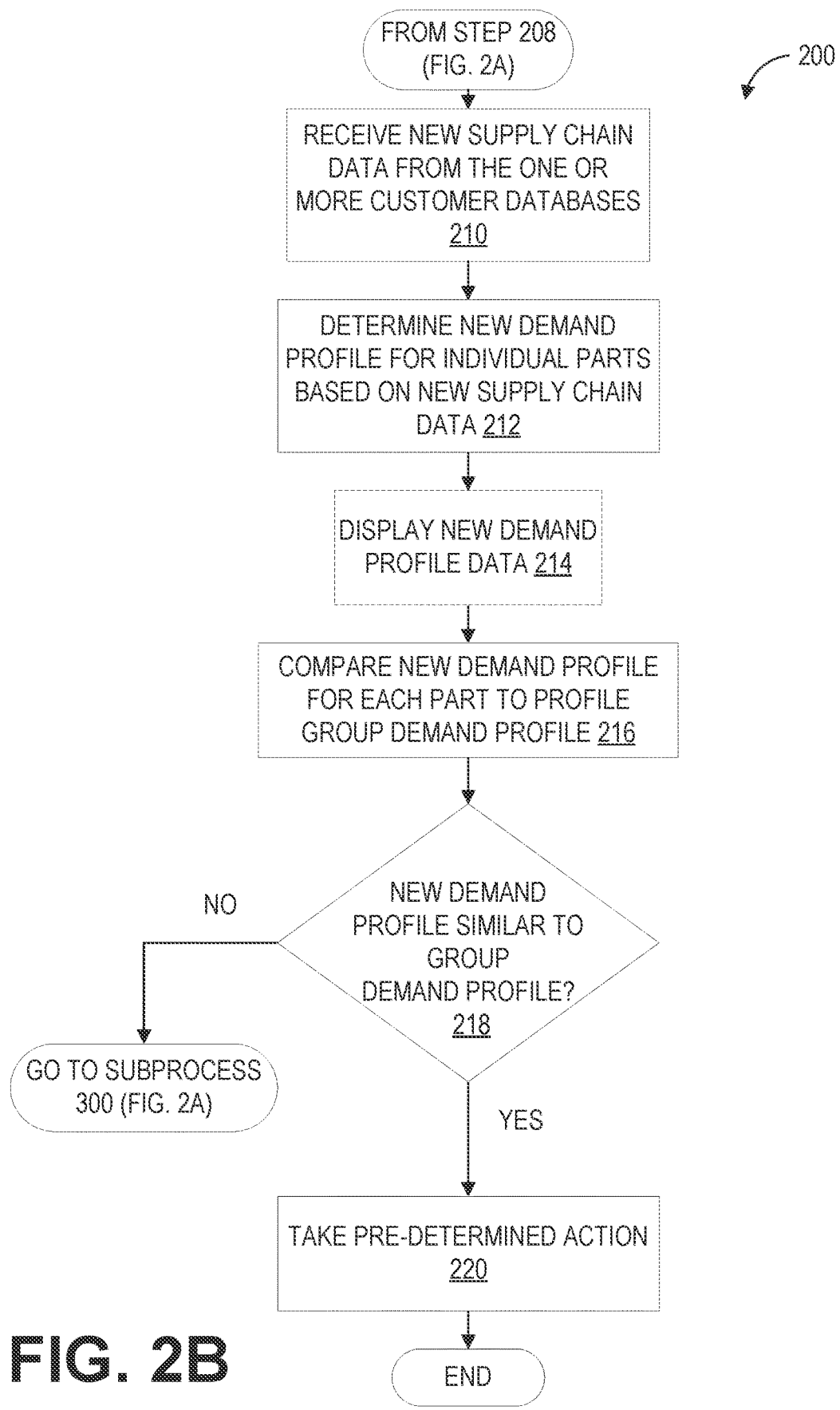
FIG. 2B illustrates a flow chart of an exemplary inventory optimization machine learning process, according to one embodiment of the present disclosure.
Figure 3:
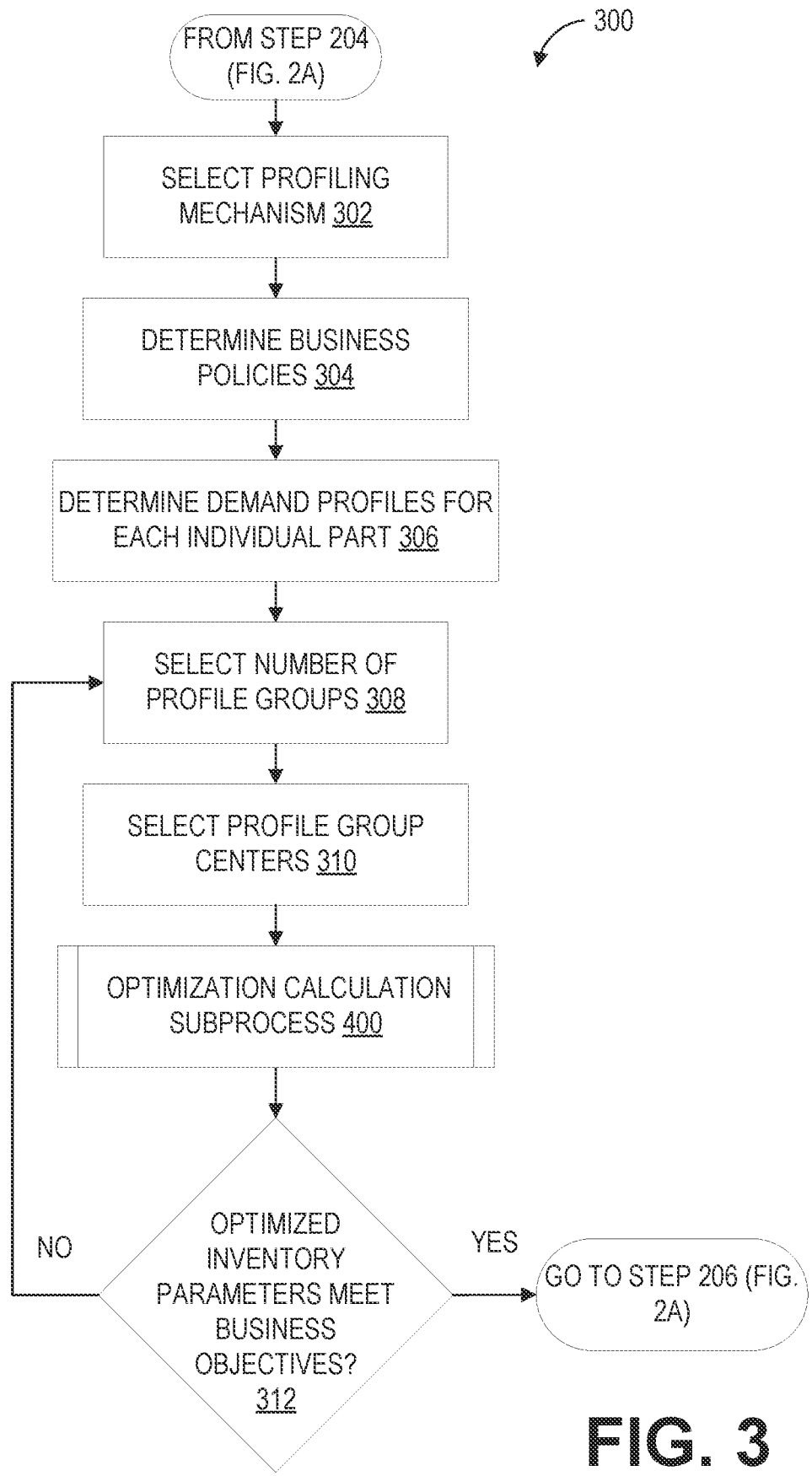
FIG. 3 illustrates a flow chart of an exemplary machine learning demand profiler subprocess, according to one embodiment of the present disclosure.
Figure 4:
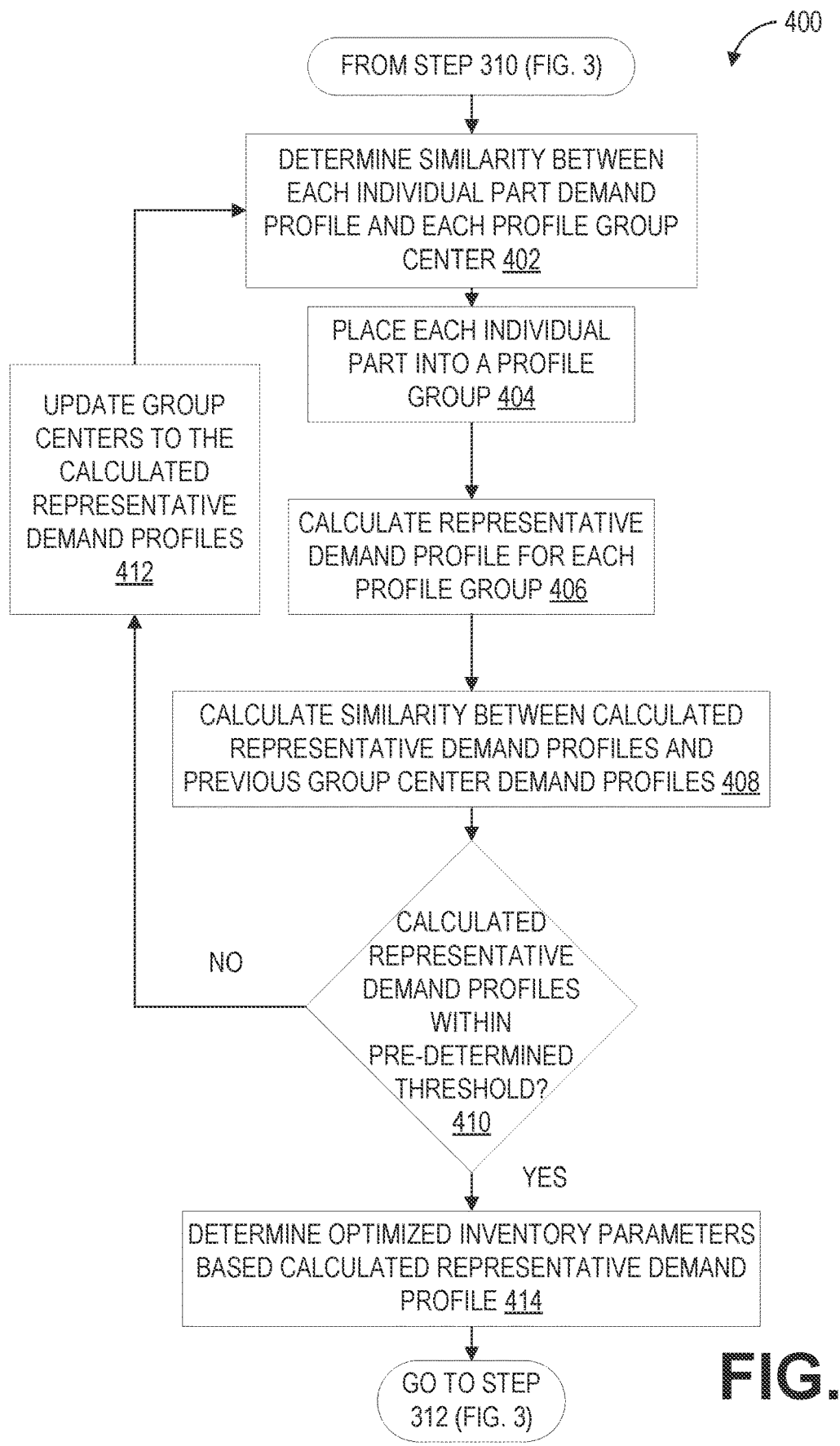
FIG. 4 illustrates a flow chart of an exemplary optimization calculation subprocess, according to one embodiment of the present disclosure.

In various embodiments, the machine learning computing system 124 may thereafter group the individual parts or groups of individual parts into similarity groups based on the similarity of demand profile of each of the individual parts or groups, which is described in more detail in the discussion of FIGS. 2-4. In many embodiments, grouping the individual parts into similarity groups allows the system to determine the optimal inventory parameters 136 for individual types of parts that have similar demand profiles, which increases the efficiency of the optimization process. For example, in one embodiment, a customer may have demand information for 50,000 types of parts, such that calculating and managing individual optimal inventory parameters 136 for each part becomes computationally inefficient. Continuing with the example, in some embodiments, grouping types of parts together based on the similarity of the individual part demand profiles reduces the number of calculations performed by the disclosed system and increases the efficiency of managing the system and inventory. In at least one embodiment, once the machine learning computing system 124 has grouped individual parts or groups together in the similarity groups, the machine learning computing system 124 may iteratively recalculate the similarity groups until the groups reach a predetermined group threshold. In one embodiment, the predetermined group threshold may be a policy developed by a system user, automatically by the disclosed system, or other parameters that determines how "close" individual part profiles may be in order to be considered "similar" to each other. In some embodiments, the predetermined group threshold policy may be a maximum group range (e.g., each individual part demand profile in a group is within a certain percentage of similarity to the calculated representative demand profile for each group). In one or more embodiments, a similarity group may be a single individual part or all of the individual parts being grouped, or any number of individual parts in between as determined by the similarity of the demand profiles. For example, in one embodiment, for ten individual parts, the disclosed system may form three groups based on the similarity of the demand profiles of each of the individual parts, a first group with five parts, a second group with 4 parts, and a third group with one part. In at least one embodiment, if the similarity groups do not reach the predetermined group threshold after a maximum amount of iterations (e.g., 1000 iterations), the disclosed system may select a new number of groups and restart the grouping process.

In several embodiments, once the machine learning computing system 124 has organized the individual parts into groups and the groups meet a certain predetermined threshold, the machine learning computing system 124 determines optimized inventory parameters 136 (also referred to as "optimal inventory parameters" herein) for the calculated representative demand profile for each of the groups. In some embodiments, the optimal inventory parameters 136 may be parameters that optimize business objectives/policies, including parameters to optimize buffering levels per individual part or group, replenishment order triggers (e.g., a specific number of parts in inventory that trigger the system to place a replenishment order for the part). In at least one embodiment, the disclosed system may determine whether the optimized inventory parameters 136 for the calculated representative demand profile for each of the groups allows the disclosed system to meet the business objectives of the customer for each individual part. In one embodiment, if the disclosed system determines that the optimized inventory parameters 136 does meet the business objectives, the disclosed system may store the optimized inventory parameters 136 in the data store 115 in the inventory manager 106, so that the customer supply chain system may implement the optimized inventory parameters 136. In one or more embodiments, if the optimized inventory parameters 136 do not meet the business objectives of the customer for each individual part, the machine learning computing system 124 may select a new number of groups and recalculate the optimized inventory parameters 136 based on the new number of groups. For example, in some embodiments, for an input of supply chain data for 1000 individual parts, the machine learning computing system 124 may first determine to organize the 1000 individual parts into 50 groups. Continuing with the example, in many embodiments, if the optimized inventory parameters 136 for the 50 groups do not meet the business objectives for the customer, then the machine learning computing system 124 may thereafter put the 1000 individual parts into 100 groups and determine the optimized inventory parameters 136 for the 100 groups, and determine whether the new optimized inventory parameters 136 meet the business objectives of the customer. As will be understood and appreciated, the example numbers of groups, iterations of groups, and other group-specific examples used herein are provided for illustrative purposes only and are not intended to limit the scope of the present disclosure in any way.

In multiple embodiments, the business objectives for a user of the present system (e.g., a customer as referenced previously in connection with customer databases 101) may include minimizing a cost of inventory (e.g., the cost of the individual parts in inventory is minimized), maximizing an on-time delivery schedule, ensuring no "stock outs" occur (i.e., times in which parts aren't stocked or available), and other similar objectives. In at least one embodiment, the on-time delivery schedule may refer to the ability for a manufacturer to manufacture or deliver a good within a predetermined amount of time. In one or more embodiments, the customer may determine the business objectives and the disclosed system may receive them from the customer supply chain system or customer databases 101. For example, in one embodiment, a customer may set the business objectives as minimizing a cost of inventory while being able to have a 98% on-time delivery schedule (e.g., 98% of received orders are filled on time).

In many embodiments, the disclosed system may then implement the parameters 136 on the customer's supply chain system to optimize the business objectives and measure the performance of the parameters in the system, including but not limited to, buffer dynamics, demand signal dynamics, and/or profiling performance. In at least one embodiment, the parameters 136 may include buffer safety margins, lead time and demand variation characterization, buffer level warning thresholds, and/or replenishment thresholds. In one embodiment, implementing the parameters 136 into the customer may represent changes to the supply chain data and/or demand data, and the process of optimizing buffer levels may restart due to the changes in input data to the process.

In multiple embodiments, the disclosed system may also be used to create one or more data/business policies and outlier detection mechanisms for individual parts to be buffered and/or grouped in order to meet business objectives. In some embodiments, the data policy may include rules for the parts to be buffered and/or grouped. For example, in one embodiment, a data policy may specify a threshold related to the frequency of orders for an individual part, so that the individual part is not buffered until the threshold amount of orders received. In one or more embodiments, the disclosed system may identify priorities and detect outlier data of the individual parts to be buffered and/or grouped. In at least one embodiment, a priority allows individual parts of certain business value to carry more weight when assessing the cost of buffering individual parts, thus allowing individual parts with a priority preferential treatment with respect to constraints, such as overall buffer budget (e.g., the minimum cost of inventory). For example, a certain individual part X may have a priority, while an individual part Y does not have a priority, thus, if the disclosed system cannot order both individual parts X and Y due to a constraint, such as limited budget or limited shipping room, etc., the disclosed system may order individual part X and not individual part Y. In many embodiments, the disclosed system may detect outlier data of the individual parts to be buffered by detecting that the individual part has an excessive cost relative to the calculated representative demand profile of the group the individual part is grouped in.

In multiple embodiments, once the optimized inventory parameters 136 are determined for a group (and the optimized inventory parameters 136 meet the business objectives), the disclosed system may store the calculated representative demand profile for the group and the associated optimized inventory parameters 135 in one or more profile registries 133. In some embodiments, the one or more profile registries 133 may include local registries (e.g., profile registries for a single customer or profile registries for identical or nearly identical parts across different customers), regional registries (e.g., profile registries for customers in a certain geographic region), and/or global registries. In one or more embodiments, as more demand profiles and associated parameters are added to the registries, similarities across parts, regions, and industries may be determined. In one embodiment, rather than calculating the representative demand profile for a group of parts, the machine learning computing system 124 may determine the demand profiles for each individual part and compare each demand profile to the demand profiles in the one or more profile registries 133, and if a demand profile for an individual part is similar to a demand profile already on the one or more profile registries 133, the disclosed system may utilize the associated optimized inventory parameters 136 in the profile registry 133 for the individual part (e.g., bypassing the calculations). Said another way, once a sufficient number of parts have been profiled in the system, future parts can be easily compared to the existing parts and similarities identified between part profiles. This enables assigning of the new parts into demand profile groups, even if those new parts are in different industries, market verticals, geographic regions, etc. as compared to the existing parts, so long as the demand profiles between the new and existing parts exhibit sufficient similarity metrics.

Turning to FIG. 2A, shown is a flow chart of an exemplary inventory optimization machine learning process 200, according to one embodiment of the present disclosure. In various embodiments, at step 202, the disclosed system may receive or retrieve supply chain data from one or more customer databases 101 (e.g., customer 101A, customer 101B, customer 101C, and customer 101N). In one or more embodiments, the supply chain data may be the demand data for one or more individual parts over a period of time, as well as any business objectives, policies, and/or priorities.

In at least one embodiment, if the customer is a new customer or there has been a disruption event with an existing customer (e.g., the customer begins manufacturing goods in a new industry or there is a world-wide shortage of a certain good, etc.), the supply chain data received at step 202 may be utilized as training set data for the inventory optimization machine learning process 200. For example, in one embodiment, the supply chain data received at step 202 may be an initial batch of supply chain data received from a customer (e.g., historical supply chain data), and the inventory optimization process 200 may utilize the historical supply chain data to determine optimal inventory parameters 136 for the historical supply chain data. As described below, in some embodiments, the disclosed system monitors the customer supply chain system after implementing the optimized inventory parameters 136 for the individual parts in order to determine any drift from the calculated representative demand profiles.

In several embodiments, at step 204, the disclosed system may pre-process the collected supply chain data by filtering out duplicate, missing, and/or invalid data, and formatting the filtered supply chain data 121.

In one or more embodiments, once the supply chain data is pre-processed, the disclosed system performs a machine learning demand profiler subprocess 300 (described in greater detail below). In many embodiments, the machine learning demand profiler subprocess 300 includes determining demand profiles for individual parts, grouping the individual parts, determining the calculated representative demand profile for each group, and determining the optimized inventory parameters 136 for each group that meet the business objectives of the customer, as described below in the discussion of FIGS. 3 and 4.

In various embodiments, after the disclosed system has determined the calculated representative demand profile for each group of parts and the associated optimized inventory parameters 136 for each group, the disclosed system may store the group demand profile (e.g., the average calculated demand profile for a group) and the associated optimized inventory parameters 136 in the one or more profile registries 133. In at least one embodiment, the disclosed system may also link and store individual part identifiers and other associated information with the group demand profile and associated parameters 136.

In multiple embodiments, at step 208, the disclosed system associates the group demand profile with the respective parts in the group. In at least one embodiment, the associated optimized inventory parameters 136 are linked to the group demand profile in the one or more profile registries 133, thus linking the optimized inventory parameters 136 with the respective individual parts in the group. In some embodiments, the inventory manager 106 may pull the optimized inventory parameters 136 from the one or more profile registries 133 and update the respective customer supply chain system. In one or more embodiments, each individual part within a similarity group is assigned the same optimized inventory parameters 136 by the disclosed system. In some embodiments, the individual part information received from the customer databases 101 may include an identifier that the disclosed system may link to the calculated optimized inventory parameters 136 for the individual part. In at least one embodiment, the disclosed system may implement the optimized inventory parameters 136 for each individual part on the customer supply chain system, or the customer supply chain system may receive the updated optimized inventory parameters 136 for each individual part from the disclosed system and implement the new parameters 136.

In at least one embodiment, if the optimized inventory parameters 136 implemented on the customer supply chain system are based on the training set supply chain data, the disclosed system may thereafter compare newly received supply chain data to the demand profile calculated from the training set supply chain data.

Turning to FIG. 2B, shown is a flow chart of an exemplary inventory optimization machine learning process 200, according to one embodiment of the present disclosure. In various embodiments, at step 210, after determining the optimized inventory parameters 136 and group demand profile for the individual parts, the disclosed system may receive new supply chain data from the one or more customer databases 101 (e.g., after an initial "training" of machine learning algorithms is performed, such that the data received at step 201 is new data that might impact the supply chain). In many embodiments, the new supply chain data may be all supply chain data created after the initial supply chain data was received by the disclosed system. In some embodiments, the disclosed system may continuously receive or retrieve new supply chain data from the customer databases 101 (e.g., continuously monitor the customer databases 101) or may receive new supply chain data in batches from the customer databases 101.

In multiple embodiments, at step 212, the disclosed system may determine a new demand profile for each individual part based on the new supply chain data. In at least one embodiment, the new demand profile for each individual part may be a demand signal time series. In some embodiments, the demand signal time series for a certain part may be a plot of the part inventory information (e.g., demand data) for the certain part over a period of time. In one or more embodiments, a demand profile may be graphical (e.g., plotted on a graph) or may be a calculated function based on the demand for an individual part over a period of time.

In several embodiments, at step 214, the disclosed system may optionally display the new demand profile data for one or more individual parts on a display (e.g., to a user operating an embodiment of the present system). In one or more embodiments, the display may be connected to the machine learning computing application and may comprise a user interface for the machine learning computing application. In at least one embodiment, the previously calculated representative demand profile for the group associated with the individual part (as described in the description of FIGS. 3 and 4) may also be displayed, along with parameter information and other supply chain data.

In various embodiments, at step 216, the disclosed system may compare the new demand profile for each individual part to the previously calculated representative demand profiles for their associated groups during the machine learning demand profiler subprocess 300. In at least one embodiment, the new demand profile and the calculated representative demand profile associated with an individual part (e.g., the group demand profile previously calculated) may be compared using a function to calculate the similarity of the two demand profiles.

In one or more embodiments, at step 218, the disclosed system determines if the new individual part demand profile is similar to the group demand profile. In some embodiments, if the two profiles are similar to a certain degree (e.g., the new demand profile is 95% similar to the calculated representative demand profile), then the system determines that the optimized inventory parameters 136 associated with the calculated representative demand profile are still the optimal inventory parameters 136 for the individual part, and the individual part remains associated with the first group demand profile and optimal inventory parameters 136.

In some embodiments, the similarity between demand profiles may be determined using a similarity function. In many embodiments, the similarity function may be a distance function that measures the distance between two lines on a graph (e.g., a Euclidean distance function), a correlation functions that utilize the shape of the demand profiles to determine similarity, a frequency domain method (e.g., a Fournier transform) that identify spectral characteristics of the demand profiles to measure similarity, or any other function that may determine the similarity between two demand profiles.

For example, in one embodiment, a distance function may calculate the distance between two points or lines on a graph (e.g., comparing the new demand profile graph to the calculated representative demand profile graph). In several embodiments, the individual part demand profiles may be plotted based on part inventory information for the individual part as a function of time, and the group demand profile associated with the individual part may similarly be plotted as demand data (average demand data for the group) as a function of time. In one or more embodiment, the disclosed system may plot the new individual part demand profile and group demand profile associated with the individual part, and for each point on the x-axis (time scale), the disclosed system may measure the difference between the y-coordinates of the two graphs. For example, in one embodiment, the new individual part demand profile and the group demand profile associated with the individual part may both be demand profiles for a period of thirty days. Continuing with the example, in several embodiments, after plotting both profiles, the disclosed system may find the y-coordinate distances for every interval on the x-axis. Still continuing with the example, in certain embodiments, on day 10 (e.g., x-coordinate for both profiles is 10), the demand data (e.g., the y-coordinate) for the group demand profile associated with the individual part may be 40 and the demand data for the new individual part demand profile may be 42. In some embodiments, the disclosed system may utilize the y-coordinate differences (the disclosed system may or may not use the absolute value of the y-coordinate differences) (e.g., for the above example, 42 minus 40 equals 2) to determine a similarity metric. In many embodiments, the disclosed system may determine the average y-coordinate difference between two profiles to determine the similarity metric, or may sum the y-coordinate differences to determine the similarity metric, or may otherwise utilize the y-coordinate differences to determine the similarity metric. In one or more embodiments, the disclosed system may utilize other distance functions or other types of functions to determine the similarity of two demand profiles. In one embodiment, the distance function may calculate a similarity metric that is used to determine whether to update the inventory parameters or not (e.g., if a new demand profile for an individual part is 95% similar to the calculated representative demand profile, then the distance function may output a similarity metric of 95).

In multiple embodiments, if the new demand profile for an individual part is not similar (e.g., does not meet a similarity minimum) to the associated group demand profile for the individual part, the disclosed system may determine that the associated optimized inventory parameters 136 for the group demand profile are not the optimal parameters, and may recalculate the optimized inventory parameters 136 via subprocess 300 based on the new supply chain data for the individual part.

For example, in one embodiment, for an individual part X, the disclosed system may calculate a new demand profile based on the new supply chain data, and then compare the new demand profile to the group demand profile for the group that part X was associated with during the machine learning part profiler subprocess 300. Continuing with the example, the disclosed system may determine, via a distance function, that the new demand profile for part X does not meet a similarity metric minimum, and thus that the currently associated optimized inventory parameters 136 with part X is not optimal, and may recalculate the optimized inventory parameters via subprocess 300.

In several embodiments, if the new demand profile for an individual part is sufficiently similar to the group demand profile as determined in step 218, then in step 220, based on the optimized inventory parameters 136, the disclosed system may take some predetermined action. In one or more embodiments, the predetermined action may be to continue monitoring the customer databases 100 for new supply chain data, automatically ordering parts to replenish inventory, sending notifications to third-parties (e.g., the customer) that the customer should reorder certain parts to replenish the inventory, and/or other similar actions.

Turning now to FIG. 3, a flow chart of an exemplary machine learning demand profiler subprocess 300 is shown, according to one embodiment of the present disclosure. In various embodiments, the machine learning demand profiler subprocess 300 may utilize the filtered supply chain data 121 from step 204 (in FIG. 2A) or the new supply chain data from step 218 to determine the optimal inventory parameters for an individual part.

In one or more embodiments, at step 302, a profiling mechanism is selected. In some embodiments, the machine learning computing system 124 or a user may select the profiling mechanism. In many embodiments, the profiling mechanism may comprise a function for calculating/determining the similarity between two demand profiles (e.g., selection between different similarity functions or other types of functions). In at least one embodiment, the machine learning computing system 124 may automatically select a specific profiling mechanism based on the received supply chain data and previously determined group demand profiles and associated optimal inventory parameters 136. For example, in one embodiment, the machine learning computing system 124 may receive a set of supply chain data that is in a generally similar range as a previous set of supply chain data, and may utilize the profiling mechanism used to determine the group demand profiles for the previous set of supply chain data.

In multiple embodiments, at step 304, the disclosed system may determine any data/business policies for the customer that may affect how individual parts are grouped or affect the optimal inventory parameters 136. In some embodiments, the data/business policies may be one or more business constraints that the customer inputs into the disclosed system. For example, in one embodiment, a certain individual part may have a long lead time from ordering the part to receiving the part in the inventory, so a customer may have a business policy that is inputted into the disclosed system for the long lead time of the certain part, so that the disclosed system may change the grouping of the certain part. In at least one embodiment, the disclosed system may change the optimized inventory parameters 136 to account for the long lead time of the certain part. In one or more embodiments, the data/business policies may also include the business objectives as discussed herein.

In several embodiments, at step 306, the disclosed system may determine demand profiles for each individual part included in the supply chain data received from the customer database 101. In one or more embodiments, demand profiles may be a function of demand data for the individual part over a period of time. For example, in one embodiment, a certain part X may have demand data of 4, 21, 13, 18, and 7 (in which the numbers represent number of times the part is ordered or how many shipments requested or times the part was used, etc.) over the period of five days. Continuing with the example, in some embodiments, the demand profile for part X may show a line graph of the parts purchased or used each day. In at least one embodiment, the time period may be on the order of hours, days, weeks, months, or years, or any time period in between (e.g., 6 weeks, 6 months, etc.). In many embodiments, the disclosed system may utilize the resulting line graph as the individual part demand profile. In some embodiments, the disclosed system may calculate a derivative function from the line graph, or may calculate a line graph function, and utilize either function as the individual part demand profile.

In various embodiments, once the profiling mechanism is selected and the individual demand profiles are determined, then, in step 308, a selection of a number of profile groups (also referred to herein as "similarity groups") is made. In one or more embodiments, the machine learning computing system 124 may automatically select a number of groups into which individual parts will be sorted based on the number of individual parts in the supply chain data and/or previously determined group numbers for a similar number of individual parts. For example, in one embodiment, if the disclosed system receives supply chain data for 50,000 individual parts, the machine learning computing system 124 may group the individual parts into 500 groups based on previous groupings of a similar number of parts (e.g., previously found optimized inventory parameters for 46,000 parts in 500 groups). In other embodiments, the disclosed system may utilize an optimization function to determine the number of groups.

Generally, the number of groups selected at step 308 will be based on a logical organization of the parts into some reasonable and workable amount of groups. This selection can be manual by a system user, or can be automated by the system itself based on knowledge of similar part groupings over time. In other embodiments, a default number of groups is identified (e.g., one group for every 10 parts) and then refined as the grouping processes are performed. In some embodiments, a given part may exhibit unique properties such that it is its own group (i.e., a group of one part).

In multiple embodiments, the disclosed system, at step 310, may select profile group "centers" from the individual part demand profiles. In one or more embodiments, a profile group center is the demand profile to which all other individual part demand profiles are compared in order to determine in which group to place each individual part demand profile. Said another way, the profile group center is intended to be a representative part that exhibits exemplar demand properties for the group. The center essentially acts as a starting point for optimization calculations, and thus the center will shift or vary as process 300 iterates. In at least one embodiment, each profile group (also referred to herein as "similarity group") has a profile group center. In some embodiments, the machine learning computing system 124 may randomly select the initial profile group centers from the individual part demand profiles. For example, in one embodiment, if the disclosed system has selected 500 groups for 50,000 parts, the disclosed system may randomly select 500 individual parts from the whole 50,000 part group to be the initial profile group centers.

In several embodiments, once the profile group centers are selected, the disclosed system performs an optimization calculation subprocess 400, as described in further detail in the FIG. 4 description. In one or more embodiments, the output of the optimization calculation subprocess 400 is optimized inventory parameters 136 for each of the profile groups (e.g., the calculated representative demand profile for a group has optimal inventory parameters). In at least one embodiment, the optimized inventory parameters 136 may be associated with each individual part within a certain profile group.

In various embodiments, at step 312, once the optimization calculation subprocess 400 calculates the optimized inventory parameters 136 for each of the profile groups, the disclosed system determines whether the optimized inventory parameters 136, if implemented into the customer supply chain system, will meet the business policies and business objectives of the customer. In at least one embodiment, the disclosed system may run a simulation of supply chain data for each individual part using the optimized inventory parameters 136 to make the determination. For example, in one embodiment, a group A may have certain optimal inventory parameters R, S, and T, and an individual part X may be grouped in group A and have the certain optimal inventory parameters R, S, and T associated with part X. Continuing with the example, in some embodiments, the disclosed system may simulate demand data for the individual part X with the parameters R, S, and T, and determine whether the business objectives and policies are met with the optimal inventory parameters. In one embodiment, the disclosed system may perform a simulation on all of the individual parts from the supply chain data, each with optimized inventory parameters 136, to determine whether the optimized inventory parameters 136 for each group meet the business objectives and policies. In at least one embodiment, the disclosed system may operate within a range of acceptability to determine the optimal inventory parameters 136. For example, in one embodiment, the optimized inventory parameters 136 of 500 groups for 50,000 individual parts may exceed a maximum inventory budget cost by $5,000 but may meet or exceed the on-time delivery schedule (e.g., 98% on-time delivery schedule), and the disclosed system may determine that the extra cost is acceptable for the given situation.

In many embodiments, if the disclosed system determines that the optimized inventory parameters 136 (and thus the calculated average group demand profiles) are within an acceptable range (e.g., meets 95% of the business objectives and policies), then the disclosed system may store the calculated average group demand profiles and the associated optimized inventory parameters 136 in the one or more profile registries 133, as discussed in step 206 in FIG. 2A.

In one or more embodiments, if the disclosed system determines that the optimized inventory parameters 136 are not acceptable parameters, the disclosed system may select a new number of profile groups for all of the individual parts being grouped and restart the process for determining the optimized inventory parameters 136 for the new number of profile groups.

For example, in one embodiment, if the disclosed system selected 500 groups for 50,000 individual parts, and determined the optimal inventory parameters 136 for each of the 500 groups, and then determined that the optimal inventory parameters 136 for one or more of the groups are not acceptable, the disclosed system may select a new number for groups (e.g., 100, 750, 1000, etc.) and thereafter determine the optimal inventory parameters 136 for each of the new number of groups (e.g., selecting new profile group centers and performing the optimization calculation subprocess 400).

In at least one embodiment, the disclosed system may include a maximum number of iterations that the disclosed system may perform before stopping the process and selecting optimal inventory parameters 136 for the current or a previous number of profile groups. For example, in one embodiment, the disclosed system may iterate through steps 302-312 and not find acceptable optimal inventory parameters 136 for any number of profile groups. In some embodiments, instead of continuing to iterate, once the process has been performed a maximum amount of times (e.g., 25 times, 100 times, etc.), the disclosed system may continue to step 206 with optimized inventory parameters that are not within the acceptable range for the business objectives and policies. In many embodiments, the disclosed system may display or otherwise notify the customer that certain individual parts or business objectives may not be met with the optimized inventory parameters 136. In one embodiment, as the disclosed system continuously monitors the supply chain data for the customer databases 101, the disclosed system may utilize the new supply chain data to retrain the group demand profiles and optimized inventory parameters.

Turning to FIG. 4, a flow chart of an exemplary optimization calculation subprocess 400 is shown, according to one embodiment of the present disclosure. In various embodiments, the optimization calculation subprocess 400 takes as inputs the individual part demand profiles, the number of profile groups, and the selected profile group centers. In one or more embodiments, at step 402, the disclosed system may determine the similarity between each individual part demand profile and the demand profiles of each of the profile group centers, and assign each individual part into the group that has the most similar demand profile. In some embodiments, the similarity between each individual part demand profile and each of the group centers is calculated by the selected profiling mechanism from step 302. For example, in one embodiment, the selected profiling mechanism may be a distance function. Continuing with the example, in many embodiments, the similarity between an individual part demand profile and a profile group center may be measured by the distance function to determine the distance between the two profiles. In at least one embodiment, the distance between the two profiles may be utilized as a similarity metric. In one embodiment, the disclosed system may compare each individual part demand profile to each profile group center and determine a similarity metric for each comparison. In some embodiments, the similarity metrics may be on a scale of 100 (e.g., percentage), or any other scale (e.g., a 1-10 scale), or may be a distance calculated disclosed system utilizing the distance function.

For example, in several embodiments, for 10 individual parts (parts A, B, C, . . . J), the disclosed system may have selected three profile groups and randomly selected parts D, G, and J as the three profile group centers. Continuing with the example, in one or more embodiments, the disclosed system may compare each of the other 7 individual part demand profiles (e.g., for parts A, B, C, E, F, H, I) with the profile group centers (e.g., parts D, G, and J) to determine the similarities (e.g., and similarity metrics) between the individual part demand profiles and the profile group centers.

In multiple embodiments, at step 404, the disclosed system associates or assigns each individual part with a profile group based on the similarities between the individual part demand profile and the demand profile for the group centers. In at least one embodiment, the individual part is associated with the group that has the most similar demand profile as the individual part demand profile. Continuing with the above example, if the similarity metrics for individual part A are 3.7 for part D, 8.4 for part G, and 7.1 for part J (on a scale of 1-10, where 10 is most similar), the disclosed system may place individual part A in the group with part G, as the demand profile for part A is most similar to the demand profile to part G.

In several embodiments, once each individual part is placed into a similarity profile group, at step 406, the disclosed system may determine a representative demand profile for the profile group based on the demand profiles of each individual part in the profile group. In some embodiments, the representative demand profile for the profile group is an exemplar demand profile that best approximates the profile group. In one or more embodiments, the disclosed system may calculate the representative demand profile by averaging the demand data of the individual parts for the group or by averaging the line graphs of each individual part in the group (including the randomly selected group center). In at least one embodiment, the disclosed system may calculate the representative demand profile such that the difference between the demand profile for each part in the similarity profile group and the calculated representative demand profile is minimized. In some embodiments, the disclosed system may utilize one or more averaging methods to determine the calculated representative demand profile that minimizes the differences between the demand profile for each part and the calculated representative demand profile. In at least on embodiment, the disclosed system may determine the calculated representative demand profile by utilize the averaging methods on each part in the group or on fewer than all the parts in the group. For example, in one embodiment, if a group has 10,000 parts, the disclosed system may determine the representative demand profile for the similarity group by calculating the average demand profile for every part in the group or from a selection of parts in the group. In some embodiments, the selection of parts in the group may be randomly determined by the disclosed system, may be determined by removing outlier demand profiles from the averaging calculation, or may be determined by any other available method for selecting part profiles from the group of parts. In one embodiment, the one or more averaging methods may include an arithmetic mean, geometric mean, median, mode, harmonic mean, generalized mean, cubic mean, and/or other averaging methods. In certain embodiments, the disclosed system may determine a range of demand profiles of the individual parts in each group and randomly select or compute a demand profile from the range of demand profiles as the calculated representative demand profile for the group. In one or more embodiments, the disclosed system may calculate the representative demand profile by any other method or function that enables the disclosed system to select a representative demand profile for a group of demand profiles.

In multiple embodiments, at step 408, for each group, the disclosed system may calculate the difference between the calculated representative demand profile and the previous group center demand profile. For example, in one embodiment, if parts A, C, G and H are grouped together, and part G was the profile group center, the disclosed system may calculate a representative demand profile for the group (e.g., average the profiles of parts A, C, G, and H) and thereafter calculate the similarity between the calculated representative demand profile and the part G demand profile. In at least one embodiment, the similarity between the representative demand profile of the group and the previous center may be calculated as described above in step 404.

In various embodiments, at step 410, the disclosed system may determine whether the calculated representative demand profile for each group is within a pre-determined threshold. In one or more embodiments, the pre-determined threshold may be based on similarity metrics or may be based on a number of iterations performed by the system, or some other similarity measure. For example, in one embodiment, the predetermined threshold may be that each individual part within a group has a similarity metric that is within a certain distance of the previous profile group center or the calculated representative demand profile. In another example, in certain embodiments, the predetermined threshold may be that the calculated similarity metric between the calculated representative demand profile and the previous group center is within a certain percentage of each other (e.g., the calculated representative demand profile is greater than 99% similar to the previous group center demand profile). In yet another example, in many embodiment, the predetermined threshold may be based on a number of iterations (e.g., 100 maximum iterations of calculating the representative demand profile for each profile group).

In one or more embodiments, the disclosed system may have two or more predetermined thresholds, in which achieving any of the two or more predetermined thresholds means that the calculated representative demand profile is within the predetermined thresholds. For example, in one embodiment, the disclosed system may have a predetermined threshold of 50 iterations and 99.5% similarity between the average group profile and the previous group center profile, and may be iterating three profile groups. Continuing with the example, in many embodiments, if on iteration 15 the similarity between the average group profile of each of the three groups and the previous group centers of each of the three groups is 99.8%, 99.5%, and 99.6%, exceeding the 99.5% similarity predetermined threshold, the iteration process ends and the calculated representative demand profile for each of the three groups is accepted as the optimal demand profile for the three groups.

In various embodiments, at step 412, if the calculated representative demand profiles for the profile groups are not within the predetermined thresholds, then the disclosed system may update the selected profile group centers from the previous group center profile to the calculated representative demand profile. For example, in one embodiment, if the disclosed system selected parts D, G, and J as the original group centers, and thereafter grouped parts A, C, G, and H together in group 1 (e.g., the group based on part G as the profile center), parts B, D, and I in group 2 (e.g., the group based on part D as the profile center), and parts E, F, and J in group 3 (e.g., the group based on part J as the profile center), the disclosed system may calculate a representative demand profile based on the demand profiles for each of groups 1, 2, and 3. In one or more embodiments, if the calculated representative demand profile for any of the groups is not within the pre-determined threshold, the disclosed system may update the group centers to the calculated representative demand profiles and restart the process at step 402. Continuing with the example, in some embodiments, the calculated representative demand profile for group 1 (e.g., the average of the demand profiles for parts A, C, G, and H) is utilized as the updated group center demand profile (replacing the demand profile of part G as a group center), and the calculated representative demand profiles for groups 2 and 3 are also utilized as updated group center demand profiles (replacing the demand profiles of parts D and J as group centers).

In several embodiments, once the group centers are updated, the disclosed system determines the similarity between each individual part demand profile and each updated group center profile (step 402). In one or more embodiments, the disclosed system again places the individual parts in a profile group (step 404), calculates the representative demand profile for each group (step 406), calculates the similarity between the calculated representative demand profile and the updated group center profile (step 408), and determines whether the calculated representative demand profile for each group (based on the updated group centers) meets a predetermined threshold (step 410). In some embodiments, if the predetermined thresholds are still not met, the system updates the group centers to the calculated representative demand profiles based on the updated group centers and begins the optimization calculation process 400 again. In at least one embodiment, the disclosed system may perform the optimization calculation process 400 for a certain number of groups until a predetermined threshold is met (e.g., either the similarity metrics are within a certain percent or range, or the process has iterated the maximum amount of times). In this way, the system learns and determines an optimal demand profile group average/center and can continuously update the same as new data is identified over time.

In multiple embodiments, at step 414, once the calculated representative demand profiles are within a predetermined threshold, the disclosed system may determine the optimized inventory parameters 136 based on the calculated representative demand profile for each group, as well as lead times for individual parts, minimum or maximum order quantities, and/or other similar supply chain data. In some embodiments, the disclosed system may determine an optimization function for each group based on the calculated representative demand profile to determine the optimized inventory parameters 136. In many embodiments, the optimized inventory parameters 136 are determined via inputting the optimization function into a supply order generation and management model (e.g., the Demand Driven Materials Requirement Planning model). In one or more embodiments, the disclosed system may thereafter determine if the optimized inventory parameters 136 are acceptable (step 312).

Figure 5:
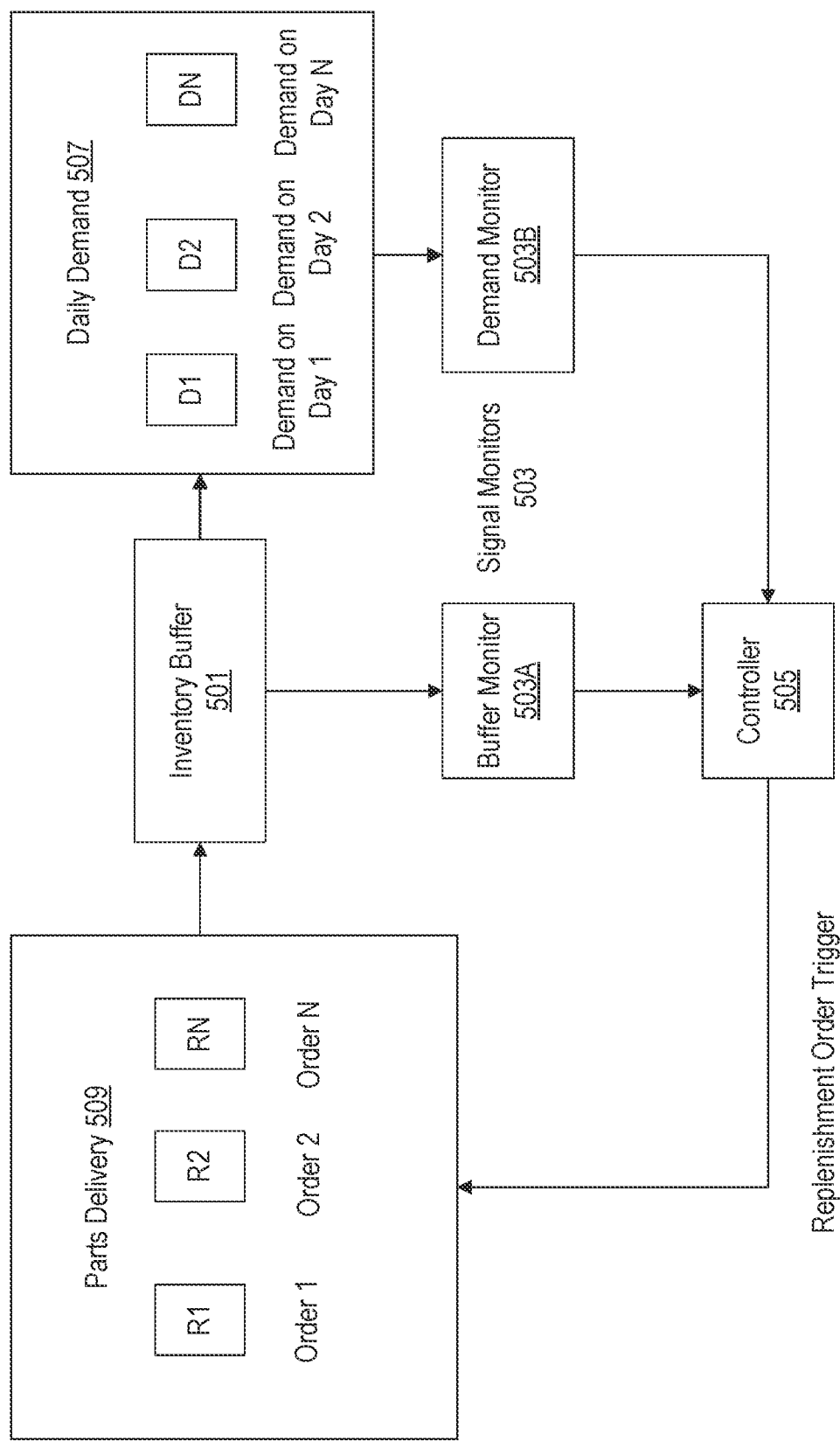
FIG. 5 illustrates an exemplary supply chain automated inventory management environment, according to one embodiment of the present disclosure.

Turning now to FIG. 5, shown is an exemplary supply chain automated inventory management environment, according to one embodiment of the present disclosure. In several embodiments, the inventory management environment may include an inventory buffer 501, signal monitors 503, a controller 505, daily demand parts delivery 507, and parts delivery 509. In at least one embodiment the inventory buffer 501 may be the amount of parts stored in inventory or in buffer inventory that are available for the manufacturer to utilize in the manufacture or distribution of a part.

In many embodiments, the signal monitors 503 may include a buffer monitor 503A and a demand monitor 503B. In one or more embodiments, the buffer monitor 503A may monitor the change in buffer inventory levels for one or more parts in inventory buffer 501. In at least one embodiment, the buffer monitor 503A may send to the controller 505 the change in buffer inventory levels for one or more parts. In some embodiments, the demand monitor 503B may monitor the daily demand 507 for each of the one or more parts, and may report the demand data to the controller 505. In one embodiment, the daily demand 507 may include the demand on day 1 ("D1"), demand on day 2 ("D2"), and the demand on day N ("DN") for each part in the inventory buffer 501.

In several embodiments, the controller 505 receives the buffer inventory data for each part from the buffer monitor 503A and the demand data for each part from the demand monitor 503B. In one or more embodiments, the controller 505 may compare the demand data and the buffer inventory data for each part to the optimal inventory parameters 136. In some embodiments, once the buffer inventory levels for a certain part are at a certain low-level threshold as defined by the optimal inventory parameters 136 for the certain part, the controller may automatically be triggered to make a replenishment order.

In one or more embodiments, the parts delivery 509 may include replenishment order 1 ("R1"), order 2 ("R2"), and order N ("RN"). In many embodiments, the replenishment orders for one or more parts increase the inventory buffer 501 for the one or more parts, which is seen by the buffer monitor 503A.

In multiple embodiments, the disclosed system may include global demand profiling. In one or more embodiments, global demand profiling may be used to quickly optimize the inventory parameters for an individual part or group without having to group parts together and calculate optimization functions. In several embodiments, the disclosed system may collect individual part demand data and determine the individual part demand profile, as described above in the step 306 description. In at least one embodiment, the disclosed system may search the one or more profile registries 133, which may contain a plurality of demand profiles for individual parts and/or groups at a local, regional, and/or global level, to find the closest exemplar to the individual part demand profile. In many embodiments, the disclosed system may calculate a difference between the closest exemplar and the individual part demand profile and associated cost with using the global exemplar. In one embodiment, the disclosed system determines if the difference is within the bounds of a policy. In one or more embodiments, if the disclosed system determines that the difference is within the bounds of the policy, the disclosed system may update the individual part profile parameters with the global exemplar optimized inventory parameters. In a further embodiment, the individual part demand profile is added to the global exemplar group. In some embodiments, if the difference is not within the bounds of the policy, the disclosed system may utilize the individual part demand profile to continue with the machine learning demand profiler subprocess 300 and optimization calculation subprocess 400 to determine the optimized inventory parameters 136 for the individual part, as described above.

In multiple embodiments, the disclosed system may adjust the optimized parameters based on deviations from expected buffer metrics, changes in business objectives and priorities, changes in demand signal dynamics, and/or planned and unplanned operational changes, by adjusting the profiling groups via machine learning as described above. For example, in one embodiment, the demand for an individual part may have changed such that the former optimized parameters 136 are no longer optimal for the new demand profile of the individual part, so the disclosed system must adjust the parameters 136 or the new demand profile of the individual part.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed system and processes may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system and processes are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the system and processes are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system and processes is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed system and processes will be readily discernible from the description herein, by those of ordinary skill in the art. Many embodiments and adaptations of the disclosure and claimed system and processes other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed system and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed system and processes. In addition, some steps may be carried out simultaneously, contemporaneously, or in synchronization with other steps.

The embodiments were chosen and described in order to explain the principles of the claimed system and processes and their practical application so as to enable others skilled in the art to utilize the system and processes and various embodiments and with various modifications as are suited to the particular use contemplated. Alternative embodiments will become apparent to those skilled in the art to which the claimed system and processes pertain without departing from their spirit and scope. Accordingly, the scope of the claimed system and processes is defined by the appended claims rather than the foregoing description and the exemplary embodiments described therein.

What is claimed is:

1. A method, comprising:
  receiving, by at least one processor, supply chain data corresponding to a plurality of parts over a computer network from at least one customer database;
  training, by the at least one processor, an inventory machine learning process using the supply chain data;
  performing the inventory machine learning process by:
    determining, by the at least one processor, a demand profile for each of the plurality of parts based on the supply chain data;
    defining, by the at least one processor, a number of similarity groups for grouping the plurality of parts according to their respective demand profiles;
    selecting, by the at least one processor, a similarity group center for each of the number of similarity groups, wherein the similarity group center comprises a demand profile for a representative part;
    applying, by the at least one processor, a calculation subprocess of the inventory machine learning process on each respective similarity group by iteratively:
      comparing, by the processor executing code to perform a similarity function, the demand profiles for each of the plurality of parts to the demand profiles of the similarity group centers to determine similarity metrics between the demand profiles for each of the plurality of parts and the demand profiles of the similarity group centers;
      assigning, by the at least one processor, each of the plurality of parts into a respective similarity group based on the similarity metrics between the demand profiles for each of the plurality of parts and the demand profiles of the similarity group centers;
      calculating, by the at least one processor, a representative demand profile for each respective similarity group; and
      determining, by the at least one processor, whether the calculated representative demand profile for each respective similarity group meets a predetermined group threshold;
    in response to the predetermined group threshold being met, determining, by the at least one processor, calculated inventory parameters for each respective similarity group based on the optimization calculation subprocess; and
    associating, by the at least one processor, the calculated inventory parameters for each respective similarity group and the calculated representative demand profile for each respective similarity group with each of the plurality of parts assigned to its respective similarity group.

2. The method of claim 1, further comprising:
upon determination that the calculated representative demand profile for each similarity group is not within the predetermined group threshold, replacing the demand profiles for each of the plurality of similarity group centers with the calculated representative demand profiles; and performing another iteration of applying the calculation subprocess on a next respective similarity group.

3. The method of claim 2, further comprising:
receiving new supply chain data for the plurality of parts;
determining a new demand profile for each of the plurality of parts based on the new supply chain data;
comparing, via the similarity function, the new demand profiles for each of the plurality of parts to the calculated representative demand profile associated with the plurality of parts to determine new similarity metrics between the new demand profiles for each of the plurality of parts and the calculated representative demand profiles associated with each of the plurality of parts; and
upon determining that the new similarity metrics are within a predetermined similarity threshold, taking a pre-determined action with respect to the plurality of parts.

4. The method of claim 1, wherein the calculated inventory parameters comprise at least one of the following: replenishment order trigger, inventory amounts, order lead times for an individual part.

5. The method of claim 3, wherein the pre-determined action comprises one or more of the following: comparing a current inventory level for one or more parts to the calculated inventory parameters and automatically placing a replenishment order for one or more parts if the current inventory level is at or exceeds a replenishment order trigger, monitoring for new supply chain data, recalculating the calculated inventory parameters for a respective part, storing the calculated representative demand profile and associated calculated inventory parameters in one or more profile registries.

6. The method of claim 1, further comprising:
displaying, on a display, one or more of the following: one or more individual part demand profiles, one or more new individual part demand profiles, one or more calculated representative demand profiles for a respective similarity group, one or more similarity metrics, the calculated inventory parameters for one or more similarity groups, supply chain data, new supply chain data.

7. The method of claim 1, wherein the similarity function comprises a distance function.

8. The method of claim 7, wherein the distance function comprises a Euclidean function.

9. The method of claim 1, further comprising:
receiving, by the at least one processor, new supply chain data from the at least one customer database; and
retraining, by the at least one processor, the inventory machine learning process to generate updated calculated inventory parameters using the new supply chain data.

10. An inventory management system, comprising:
a memory configured to store supply chain data; and
at least one processor operatively connected to the memory, the at least one processor configured for:
receiving supply chain data corresponding to a plurality of parts over a computer network from at least one customer database;
storing the supply chain data in the memory;
training an inventory machine learning process using the supply chain data;
performing the inventory machine learning process by:
determining a demand profile for each of the plurality of parts based on the supply chain data;
defining a number of similarity groups for grouping the plurality of parts according to their respective demand profiles;
selecting a similarity group center for each of the number of similarity groups, wherein the similarity group center comprises a demand profile for a representative part;
applying a calculation subprocess of the inventory machine learning process on each respective similarity group by iteratively:
comparing, via a similarity function, the demand profiles for each of the plurality of parts to the demand profiles of the similarity group centers to determine similarity metrics between the demand profiles for each of the plurality of parts and the demand profiles of the similarity group centers;
assigning each of the plurality of parts into a respective similarity group based on the similarity metrics between the demand profiles for each of the plurality of parts and the demand profiles of the similarity group centers;
calculating a representative demand profile for each respective similarity group; and
determining whether the calculated representative demand profile for each respective similarity group meets a predetermined group threshold;
in response to the predetermined group threshold being met, determining calculated inventory parameters for each respective similarity group based on the calculation subprocess; and
associating the calculated inventory parameters for each respective similarity group and the calculated representative demand profile for each respective similarity group with each of the plurality of parts assigned to its respective similarity group.

11. The system of claim 10, wherein the at least one processor is further configured for:
upon determination that the calculated representative demand profile for each similarity group is not within the predetermined group threshold, replacing the demand profiles for each of the plurality of the similarity group centers with the calculated representative demand profiles; and
performing another iteration of applying the calculation subprocess on a next respective similarity group.

12. The system of claim 10, wherein the at least one processor is further configured for:
receiving new supply chain data for the plurality of parts;
determining a new demand profile for each of the plurality of parts based on the new supply chain data;
comparing, via the similarity function, the new demand profiles for each of the plurality of parts to the calculated representative demand profile associated with the plurality of parts to determine new similarity metrics between the new demand profiles for each of the plurality of parts and the calculated representative demand profiles associated with each of the plurality of parts; and
upon determining that the new similarity metrics are within a predetermined similarity threshold, taking a pre-determined action with respect to the plurality of parts.

13. The system of claim 10, wherein the calculated inventory parameters comprise at least one of the following: replenishment order trigger, inventory amounts, order lead times for an individual part.

14. The system of claim 12, wherein the pre-determined action comprises one or more of the following: comparing a current inventory level for one or more parts to the calculated inventory parameters and automatically placing a replenishment order for one or more parts if the current inventory level is at or exceeds a replenishment order trigger, monitoring for new supply chain data, recalculating the calculated inventory parameters for a respective part, storing the calculated representative demand profile and associated calculated inventory parameters in one or more profile registries.

15. The system of claim 10, further comprising:
a display for displaying one or more of the following: one or more individual part demand profiles, one or more new individual part demand profiles, one or more calculated representative demand profiles for a respective similarity group, one or more similarity metrics, the calculated inventory parameters for one or more similarity groups, supply chain data, new supply chain data.

16. The system of claim 10, wherein the similarity function comprises a distance function.

17. The system of claim 16, wherein the distance function comprises a Euclidean function.

* * * * *